Jan. 8, 1952 M. W. P. STRANDBERG 2,581,819
COAXIAL TERMINATION FOR NOISE DIODES
Filed Sept. 20, 1949

INVENTOR.
Malcom W. P. Strandberg

Patented Jan. 8, 1952

2,581,819

UNITED STATES PATENT OFFICE 2,581,819

COAXIAL TERMINATION FOR NOISE DIODES

Malcom W. P. Strandberg, Cambridge, Mass.

Application September 20, 1949, Serial No. 116,737

12 Claims. (Cl. 315—39)

Figures 1, 2:
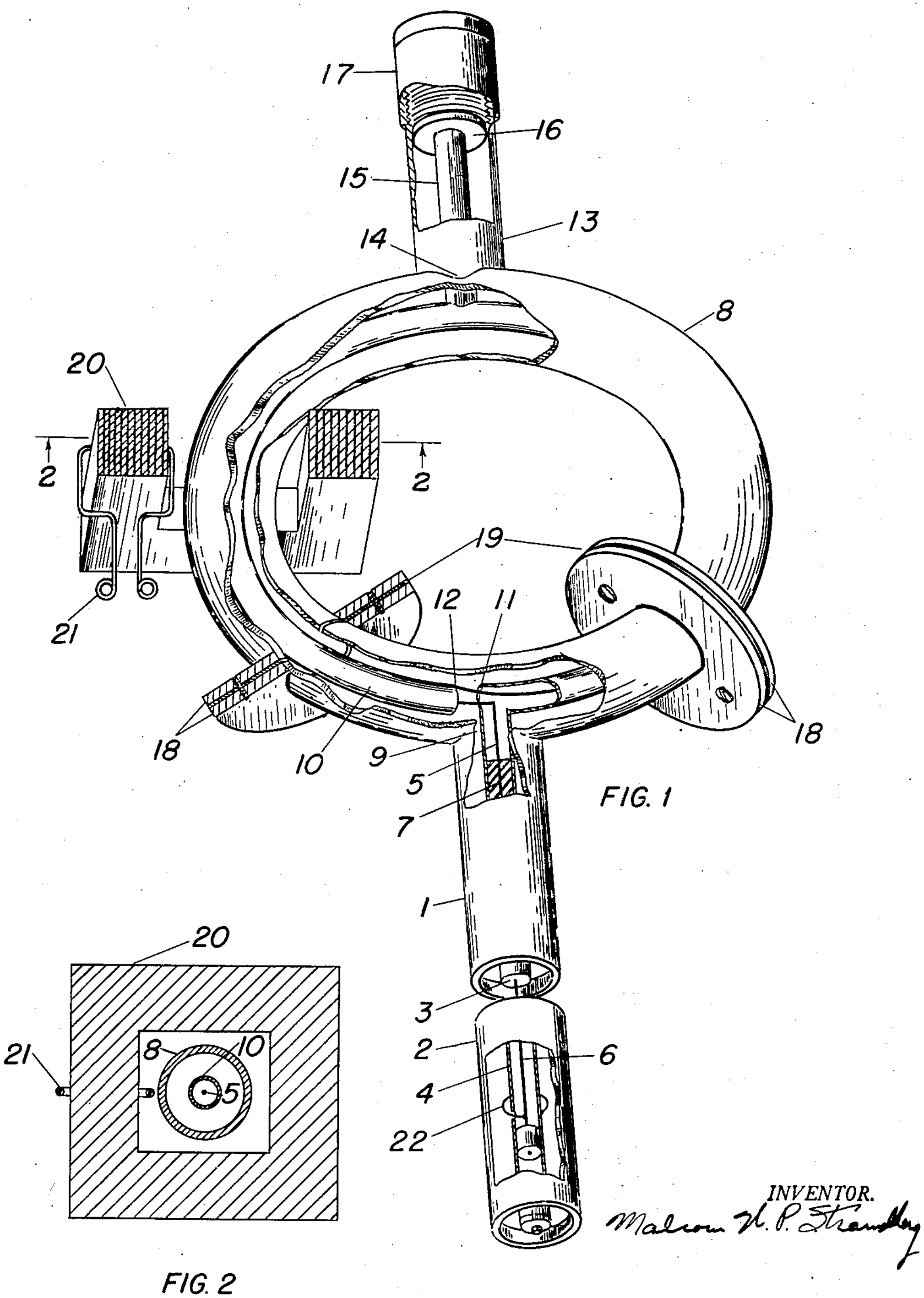

The invention relates to an apparatus for terminating coaxial equipment such as noise generating diodes used in sensitivity measurements in radio and radar equipment. More particularly it is concerned with a new and improved means for terminating coaxial equipment in which it is necessary to activate a secondary low frequency electrical circuit located axially of the equipment without disturbing the symmetry of the high frequency circuit.

Originally sensitivity measurements on radio equipment were performed by introducing a continuous wave carrier of known amplitude into the equipment under test, and comparing this known value with the inherent equipment noise. As an alternative to this procedure, a diode of conventional construction may be used to generate a calculable voltage, which may be used as a test signal in place of the above CW carrier. In a recent refinement, the diode has been constructed in coaxial form thus increasing the frequency region over which easily calculable operation may be obtained. It can be seen that the coaxial noise diode, because of its simple geometry, possesses distinct advantages over the conventional diode structure that it replaces.

However, utilization of the coaxial noise diode precipitates one inherently difficult problem, namely, terminating its coaxial cable structure and simultaneously supplying power for the filament, which is associated with the central conductor in the coaxial system.

Assume that the device to be tested is attached to the output side of the diode, and that this device is supposed to be activated by a source (e. g., an antenna) of fifty ohms impedance. The diode and its associated termination must present at once an impedance of fifty ohms between the inner and outer conductors, and the diode must also be provided with a low-voltage source of power for the filament, which is associated with the center conductor of the diode. At the present time this difficulty hampers the use of the otherwise superior operating frequency range of the coaxial noise diode.

The apparatus currently employed to meet the above problem of terminating a coaxial noise diode and supplying it with proper filament potential requires bulky and expensive equipment leaving much to be desired in terms of accurate impedance control. The diode filament must be fed through the center conductor of the coaxial line which forms one of the terminals of the load.

One form of present equipment consists of a twisted pair attached to the diode filament, which pair furnishes the central line of a type of coaxial cable, measuring a hundred feet or more in length. To the other end of the pair is connected a source of filament voltage (A. C. or D. C.). Between the central pair in the cable and the outer tube of the cable (which is connected to and forms a continuation of the outer tube of the diode), there is inserted a material having a high coefficient of electrical absorption. The purpose of this structure is to provide a filament source and at the same time to furnish the requisite high frequency termination for the diode. The low frequency termination is accomplished by placing an ordinary fifty ohm resistance between one side of the inner twisted pair and the outer cylinder of the cable.

Not only is this conventional apparatus cumbersome in use but it is also subject to variable factors which arise from the use of high and low frequency termination in conjunction with a non-simple center conductor. Furthermore, while the above discussion has been directed toward the problem as exemplified by noise diodes, it will be realized that this problem exists wherever it is desired to introduce power to the central conductor of a coaxial system without interfering with the transmission characteristics of a coaxial line.

Accordingly, it is an object of the present invention to make alternating voltage power, for example heater power, available within the confines of the center conductor of a coaxial line in such fashion as not to interfere with the original transmission characteristics as they exist over a prescribed frequency region.

Another object of the present invention consists in providing an apparatus for matched termination to be used with a coaxial noise diode such that alternating voltage power can be supplied to the diode heater associated with the center conductor of the diode, while preserving its original matching characteristics.

A still further object of this invention consists in an apparatus for coaxial noise source termination possessing a higher degree of efficiency and accuracy than is possible with current methods and apparatus.

Still another object of the present invention is the provision of termination apparatus which furnishes for noise diodes improved matching characteristics over that obtained from other less direct methods in present use.

Yet another object of the present invention is to provide a means for terminating sensitivity-measuring noise diodes, eliminating the cumbersome equipment now utilized and substituting simple, compact equipment, occupying a small fraction of the space now required and representing substantially less cost than that of currently available equipment.

With the foregoing and other objects in mind, as will hereinafter more fully appear, the invention consists in the novel arrangement and combination of parts as disclosed in the following detailed description of a preferred embodiment of the same taken in connection with the accompanying drawings in which like numerals refer to like parts in the several views, and in which Fig. 1 is an isometric projection of apparatus according to the invention, with portions broken away and other portions in section more clearly to illustrate the features of novelty, and Fig. 2 is a section on line 2—2 of Fig. 1.

Referring to the drawings there is disclosed the invention as applied to terminating a coaxial noise diode such as used for generating a signal of known characteristics for testing of very high frequency equipment. Here it is desired to provide a matching termination for the diode which will permit introduction of a filament current for activating the diode without disturbing the electrical symmetry of the circuit.

The diode itself comprises an outer shell 2 forming its plate, an inner coaxial cylinder 4 and a filament 22. For use with the diode, according to the invention, there is provided a termination permitting the induction of a current in the filament circuit without interfering with the symmetry of the high frequency circuit. The novel apparatus comprises a cylinder 1 which forms a continuation of the plate 2 of the diode. Within the outer cylinder 1 there is mounted an inner coaxial cylinder 3, which may be held in its proper position by any suitable dielectric means according to the usual practice. The inner cylinder 3 forms a continuation of the diode. Within the inner cylinder 3 there is mounted an inner coaxial wire 5 which serves as a continuation of the terminal lead 6 of the diode heater 22, which wire 5 being supported by dielectric 7. At its end opposite to the diode connection the cylinder 1 is attached into a metallic toroid 8 forming a joint 9 therewith, the toroidal wall being cut away along the line of juncture to form a hole. The inner cylinder passes through the joint 9 and bends to right of Fig. 1, to form an inner toroid 10 concentric with the outer shell 8, but broken so as to end just short of rejoining itself at the bend. The inner cylinder is pierced as at 11 and the axial conductor 5 is led out therethrough, centrally of the inner toroid 10 and is soldered at 12 to the inner toroid wall at the termination of the latter. As explained hereinafter, the axial conductor 5 may be attached to the inner toroid 10 at the termination of the latter without passing centrally of the inner toroid 10. However, in this alternative form results will be somewhat less effective.

Diametrically opposite to the cylinder 1, there is attached to the outer toroidal shell 8 a second outer cylinder 13. This second shell, being in line with the first shell will be symmetrical, in an electrical sense, therewith. A second inner cylinder 15 similarly forms a continuation of the similar coaxial elements 3 and 10 and is mounted coaxially with the cylinder 13. At their extremities the inner cylinder 15 and outer cylinder 13 are joined together by a disk resistor 16 and a shield 17, in a manner well known in the art.

The outer toroid 8 is broken at equal distances and not far from the joint 9, and mechanically held by flanges 18, separated and insulated from each other by insulating films 19, thus forming low capacity condensers in the high frequency circuit.

As best seen in Fig. 2, an iron core 20 surrounds the outer toroid 8. The core in turn is encircled by an electrical winding wire 21 connected to a suitable source of low frequency power, such as the usual 60-cycle lighting circuit.

In use termination apparatus is plugged into the noise diode, forming a continuation of the coaxial circuit thereof by the provision of the elements 1, 3 and 5 which correspond to the similar elements 2, 4 and 6 of the diode. With the flow of an alternating current in the winding 21, an alternating magnetic flux is generated in the iron core 20 which in turn induces an alternating voltage between the inner wire 5 and the inner cylinder 3, by virtue of the alternating linkage of the flux with the inner toroid 10 and the attached inner wire 5. This induced voltage then causes the heater current to flow in the diode heater 22. No current, however, will flow in the outer toroid 8, since the electrical capacity of the flanges 18 is too small at the low frequencies used for the heater circuit.

The concentric cylinders 1 and 3 therefore form a coaxial line of impedance $Z_0$. The members 8 and 10 form a coaxial line of impedance $2Z_0$ consisting of two halves in parallel, thus providing a net impedance of $Z_0$ which matches the input. Since the coaxial toroid structure of the invention formed by the members 8 and 10, is also connected symmetrically to the concentric cylinders 13 and 15, which in turn are dimensioned to provide an impedance $Z_0$, this line is then terminated by the resistor 16, which has a resistance of $Z_0$. The shield 17 prevents radiation resistance of free space from varying the effective high frequency resistance of the element 16.

The flanges 18 form condensers of sufficient capacity at radio frequencies so that the toroid 8 has electrical continuity throughout. The stray capacity between the conductor 5 and the inner toroidal shell 10 makes the shell 10 also appear continuous at radio frequencies, thus furnishing electrical continuity across the mechanical break in the inner toroid 10.

Apparatus, according to the invention, may be employed at various frequencies, provided only that for proper operation the circumference of the inner shell 10 must be less than one wave length. Adjustment of the dimensions for the particular frequencies to be employed is well within the skill of those versed in the art.

While I have disclosed and described a preferred embodiment of apparatus for use in practicing the invention, it will be understood that various changes and modifications may be made therein by those skilled in the art within the spirit and scope of the appended claims.

The United States Government holds a non-exclusive, irrevocable and royalty-free right and license, for all government purposes, to practice and cause to be practiced, and to make, have made, use and sell articles embodying this invention.

I claim:

1. In apparatus for terminating a coaxial line having principal and secondary circuits for different frequencies in which the principal circuit comprises inner and outer concentric cylinders and the secondary circuit comprises said inner cylinder and a coaxial conductor disposed within the same, means for energizing the secondary circuit without disturbing the symmetry of the principal circuit, which comprises: a coaxial structure of matching impedance for attachment to said line, said structure including continuations of said cylinders and said conductor and dividing at a point of division into two balanced rejoining loops forming said cylinder continuations into inner and outer concentric toroids surrounding said conductor extension and terminating in a matched extension opposite the point of division, each said loop having an impedance twice the value of the impedance of said line, and said extension having an impedance matching that of said line, said inner toroid being cut close to the point of division and said conductor being connected to the end of said inner toroid where the latter is cut, and means associated with one of said loops for inducing a current in said inner conductor and its corresponding secondary circuit, said outer toroid being discontinuous with respect to the frequency of said induced current but arranged to pass the current of said principal circuit.

2. Apparatus in accordance with claim 1 in which the means for inducing a current in said secondary circuit consists of an iron core surrounding one of said loops and an induction coil for said core.

3. Apparatus for terminating a coaxial noise diode and for supplying filament current thereto without disturbing the electrical symmetry of said diode, said diode having principal and secondary circuits for different frequencies, in which the principal circuit comprises inner and outer concentric cylinders and the secondary circuit comprises said inner cylinder and a coaxial conductor disposed within the same together with a filament connecting said inner cylinder and said conductor, which apparatus comprises: a coaxial structure of matching impedance for attachment to said diode, said structure including continuations of said cylinders and said conductor and dividing at a point of division into two electrically balanced rejoining loops forming said cylinder continuations into inner and outer concentric toroids terminating in a matched extension opposite the point of division, each of said loops having an impedance twice the value of the impedance of said diode, and said extension having an impedance matching that of said diode, said inner toroid being cut close to the point of division and said conductor being connected to the end of said inner toroid where the latter is cut, and means associated with one of said loops for inducing a current in said inner conductor for energizing said filament, said outer toroid being discontinuous with respect to the frequency of said induced current but arranged to pass the frequency of said principal circuit.

4. Apparatus in accordance with claim 3 in which the means for inducing a current in said secondary circuit consists of an iron core surrounding one of said loops and an induction coil for said core.

5. In apparatus for terminating a coaxial line having principal and secondary circuits for different frequencies in which the principal circuit comprises inner and outer concentric cylinders and the secondary circuit comprises said inner cylinder and a coaxial conductor disposed within the same, means for energizing the secondary circuit without disturbing the symmetry of the principal circuit, which comprises: a coaxial structure of matching impedance for attachment to said line, said structure including continuations of said cylinders and said conductor and dividing at a point of division into two electrically balanced rejoining loops forming said cylinder continuations into inner and outer concentric toroids and terminating in a matched extension opposite the point of division, each of said loops having an impedance twice the value of the impedance of said line, the said extension having an impedance matching that of said line, said inner toroid being cut close to the point of division and said conductor being connected to the end of said inner toroid where the latter is cut, said outer toroid being cut at points respectively equidistant from said point of division, the segments thus formed being separated by a dielectric creating a capacitor which will pass currents at the frequencies of said principal circuit but incapable of passing currents at the frequencies of said secondary circuit, and means associated with one of said loops for inducing a current in said inner conductor and its corresponding secondary circuit.

6. In apparatus for terminating a coaxial line having principal and secondary circuits for different frequencies in which the principal circuit comprises inner and outer concentric cylinders and the secondary circuit comprises said inner cylinder and a coaxial conductor disposed within the same, means for energizing the secondary circuit without disturbing the symmetry of the principal circuit, which means comprises: a coaxial structure of matching impedance for attachment to said line, said structure including continuations of said cylinders and said conductor and dividing at a point of division into two electrically balanced rejoining loops forming said cylinder continuations into inner and outer concentric toroids and terminating in a matched extension opposite the point of division, each of said loops having an impedance twice the value of the impedance of said line, and said extension having an impedance matching that of said line, said inner toroid being cut close to the point of division and said conductor being connected to the end of said inner toroid where the latter is cut, and means associated with one of said loops for inducing a current in said inner conductor and its corresponding secondary circuit, said outer toroid being discontinuous with respect of said induced current but arranged to pass the current of said principal circuit.

7. In apparatus for terminating a coaxial line having principal and secondary circuits for different frequencies in which the principal circuit comprises inner and outer concentric cylinders and the secondary circuit comprises said inner cylinder and a coaxial conductor disposed within the same, means for energizing the secondary circuit without disturbing the symmetry of the principal circuit, which comprises: a coaxial structure of matching impedance for attachment to said line, said structure including continuations of said cylinders and said conductor and dividing at a point of division into two electrically balanced rejoining loops forming said cylinder continuations into inner and outer concentric toroids surrounding said conductor extension and terminating in a matched extension opposite the point of division, each of said loops having an impedance twice the value of the impedance of said line, and said extension having an impedance matching that of said line, said inner toroid having an opening close to the point of division and said conductor continuation entering said inner toroid through said opening and continuing axially within said toroid, emerging therefrom near said point of division and being connected to said inner toroid where the latter is cut, and means associated with one of said loops for inducing a current in said inner conductor and its corresponding secondary circuit, said outer toroid being discontinuous with respect to the frequency of said induced current but arranged to pass the current of said principal circuit.

8. In a coaxial system having a central conductor and two outer conductors concentric therewith in which the central conductor and one of the outer conductors comprise a first circuit of one frequency and the two outer conductors comprise a second circuit of another frequency, means for energizing said first circuit without disturbing the symmetry of said second circuit which comprises: a coaxial structure connectable to said system, said structure having coaxial conducting members corresponding to said central and outer conductors to form extensions thereof and of the circuits thereof with matching impedance, the two outer members thereof dividing into two rejoining arms surrounding the member which constitutes the extension of said central conductor to form a loop, said conducting members being so connected electrically that said first circuit follows a series path around said loop and said second circuit follows a parallel path around said loop, the impedance of said structure matching that of said system, means associated with one of said arms for inducing a current in said first circuit, means for blocking the passage of any current in said second circuit at the frequency of said first circuit, and a terminal resistor of the impedance of the system connected between the conductors comprising said second circuit near where said arms rejoin.

9. Means for supplying the filament current to a coaxial noise diode without disturbing the symmetry of the plate circuit thereof, said diode having an outer shell for its plate, an inner shell, and a central conductor within said inner shell, its filament being connected between said central conductor and said inner shell, said means comprising a coaxial structure attachable to said diode, said structure having coaxial members corresponding to said outer and inner shells and said conductor and constituting extensions thereof, said members dividing into rejoining arms to form a loop and being so connected electrically that the filament circuit follows a series path around said loop and the plate circuit follows a parallel path around said loop, a terminating resistance between the members forming the plate circuit where they rejoin and matching their impedance, and an induction device associated with one of said arms for inducing a current in said filament circuit.

10. Apparatus in accordance with claim 9 including capacitance means for preventing the passage of current at the frequency of said filament circuit in the members constituting said plate circuit.

11. Apparatus for terminating the principal circuit of a coaxial line and for energizing the secondary circuit of said line wherein said principal circuit comprises outer and inner concentric cylinders and said secondary circuit comprises said inner cylinder and inner conductor axially disposed within said inner cylinder, which apparatus comprises a matched extension of said principal circuit of said line, said extension dividing at a point of division and the principal circuit thereof diverging in electrically parallel rejoining arms, each arm possessing twice the impedance of said line, a continuation of said principal circuit extending from the point where said arms converge to a termination point, a resistance across said principal circuit at said latter point equivalent to the impedance of said line, said inner cylinder being severed in one of said arms at a point adjacent to said point of division and said inner conductor being connected to the arm end of said inner cylinder where the latter is severed, said outer cylinder in said arms being severed at points equidistant from said point of division, the respective segments thereof being separated sufficiently to block passage of low frequency alternating current but not to block high frequency alternating current and means for inducing low frequency alternating potential in said inner cylinder in one of said arms.

12. Apparatus in accordance with claim 11 in which the means for inducing an alternating potential in said inner cylinder consists of an iron core surrounding one of said arms and a primary winding upon said core.

MALCOM W. P. STRANDBERG.

No references cited.